(12) United States Patent
Heinrich et al.

(10) Patent No.: US 12,452,962 B2
(45) Date of Patent: Oct. 21, 2025

(54) ROBUST VERSATILE MONOLITHIC RESISTIVE SYSTEM FOR TAILORED HEATING

(71) Applicant: Lockheed Martin Corporation, Bethesda, MD (US)

(72) Inventors: Jonathon Robert Heinrich, Albuquerque, NM (US); Frans Hendrik Ebersohn, Palmdale, CA (US); Randall James Sovereign, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1005 days.

(21) Appl. No.: 16/829,525

(22) Filed: Mar. 25, 2020

(65) Prior Publication Data

US 2021/0307117 A1 Sep. 30, 2021

(51) Int. Cl.
*H05B 3/14* (2006.01)
*H05B 3/03* (2006.01)

(52) U.S. Cl.
CPC .............. *H05B 3/145* (2013.01); *H05B 3/03* (2013.01); *H05B 2203/003* (2013.01)

(58) Field of Classification Search
CPC .. D05B 69/20; D05B 27/22; H05B 2203/003; H05B 3/03; H05B 3/145; H05B 3/84
USPC ........................................................ 219/553
See application file for complete search history.

(56) References Cited

U.S. PATENT DOCUMENTS

| | | | | |
|---|---|---|---|---|
| 3,803,441 A | * | 4/1974 | Ohsawa ................... | H01J 1/24 313/340 |
| 4,001,760 A | * | 1/1977 | Howie ...................... | H01B 7/16 219/544 |
| 4,310,747 A | * | 1/1982 | Rice ........................ | H05B 3/145 338/225 |
| 4,334,350 A | * | 6/1982 | Rice ........................ | F24H 9/1863 29/611 |
| 7,595,464 B2 | * | 9/2009 | Konishi ................... | F24C 7/065 219/541 |
| 7,805,065 B2 | * | 9/2010 | Chan ........................ | F24C 7/043 392/420 |
| 8,444,835 B2 | * | 5/2013 | Elibol ...................... | G01N 27/283 204/411 |

(Continued)

FOREIGN PATENT DOCUMENTS

DE 112016000876 * 8/2023
EP 2362154 10/2016

(Continued)

OTHER PUBLICATIONS

9976466 HTMl format for citations ref other (Year: 2020).*

(Continued)

*Primary Examiner* — Steven W Crabb
*Assistant Examiner* — Fahmida Ferdousi
(74) *Attorney, Agent, or Firm* — Baker Botts L.L.P.

(57) ABSTRACT

A monolithic heating element is provided. In one embodiment, the heating element includes a monolithic structure that is not a filament and a plurality of electrodes attached to the monolithic structure. Application of an electric current between the plurality of electrodes generates heat in the monolithic structure which can be tailored to any desired heating profile and is robust to single point failures due to thermal runaway.

15 Claims, 7 Drawing Sheets

(56) References Cited

U.S. PATENT DOCUMENTS

| | | | |
|---|---|---|---|
| 9,232,315 B2 | 1/2016 | Martin et al. | |
| 9,347,682 B2 | 5/2016 | Etter | |
| 9,638,438 B2 | 5/2017 | Flint et al. | |
| 9,827,517 B2* | 11/2017 | Vecitis | B82Y 30/00 |
| 9,835,063 B2* | 12/2017 | Hosoi | C04B 35/195 |
| 9,976,466 B2* | 5/2018 | Takase | F01N 3/2026 |
| 10,134,502 B2* | 11/2018 | Elverud | H05B 3/145 |
| 10,246,777 B2 | 4/2019 | Kondo | |
| 10,362,637 B2 | 7/2019 | Lindley et al. | |
| 2008/0145749 A1* | 6/2008 | Iacovangelo | H01M 4/366 |
| | | | 29/623.2 |
| 2009/0277897 A1* | 11/2009 | Lashmore | H01B 1/04 |
| | | | 219/544 |
| 2013/0330514 A1* | 12/2013 | Cawse | C08J 5/243 |
| | | | 156/60 |
| 2014/0238975 A1* | 8/2014 | Alferyev | H05B 3/64 |
| | | | 219/540 |
| 2015/0351159 A1* | 12/2015 | Kamijo | F27B 9/063 |
| | | | 264/674 |
| 2017/0260887 A1* | 9/2017 | Takase | F01N 3/2828 |
| 2019/0053539 A1* | 2/2019 | Davis | A24F 40/44 |
| 2019/0350256 A1* | 11/2019 | Hejazi | A24F 40/44 |
| 2019/0375515 A1* | 12/2019 | Khosravani | B64D 45/02 |
| 2020/0113243 A1* | 4/2020 | Novak, III | A24F 40/46 |
| 2020/0185590 A1* | 6/2020 | Malhotra | B32B 38/10 |

FOREIGN PATENT DOCUMENTS

| | | | |
|---|---|---|---|
| WO | WO98/02382 | * | 1/1998 |
| WO | WO2018/183585 | * | 10/2018 |
| WO | WO2020244733 | * | 12/2020 |

OTHER PUBLICATIONS

"Reticulated Vitreous Carbon Foam" Ultramet Advanced Materials Solutions; Copyright 2018 Ultramet; downloaded from: https://ultramet.com/refractory-open-cell-foams/reticulated-vitreous-carbon-foam/ on Feb. 5, 2020.

Luis F. Arenas, Richard P. Boardman, Carlos Ponce de Leon, Frank C, Walsh; "X-ray computed micro-tomography of reticulated vitreous carbon" ScienceDirect; © 2018 Elsevier Ltd. All rights reserved; downloaded from: https://www.sciencedirect.com/science/article/abs/pii/S0008622318303397 on Feb. 5, 2020.

* cited by examiner

FIG. 4B

ROBUST VERSATILE MONOLITHIC RESISTIVE SYSTEM FOR TAILORED HEATING

TECHNICAL FIELD

This disclosure relates in general to a new approach for a versatile and robust monolithic heating system which is robust to thermal runaway and which can be simply tailored to a variety of heating profiles, according to certain embodiments.

BACKGROUND

Heating systems may be used for a variety of applications but are often prone to single points of failure and limited in the heating profiles they can reasonably accommodate. A need exists for a robust heating system which can be easily tailored to a variety of heating profiles. This is achievable through using monolithic resistive heaters created out of foam-like structures which can easily be machined and shaped to give a desired heating profile through the heater. Furthermore, the monolithic, foam-like structure is robust to single point failures which are present in traditional heating systems which implement zig-zag or serpentine shapes.

SUMMARY OF THE DISCLOSURE

According to one embodiment, a monolithic heating element is provided. The monolithic heating element includes a monolithic, foam structure that is not a filament and a plurality of electrodes attached to the monolithic structure. Heat may be generated in the monolithic structure through the application of an electric current between the plurality of electrodes.

According to another embodiment, a method of heating a monolithic heating element is provided. The method includes providing a monolithic structure that is not a filament and attaching a plurality of electrodes to the monolithic structure. Application of electric current to the plurality of electrodes may cause current to flow in a plurality of discrete paths throughout the monolithic structure.

Technical advantages of certain embodiments may include the ability to form many paths for electric current to travel in a heating element, thereby enabling a more robust monolithic heating system and making the monolithic heating system immune to thermal runaway which results in failure in current heater technology. Further, certain embodiments described herein may facilitate ease of manufacture and the ability to tailor a monolithic heating system for specialized applications. These shapes can be tailored to fit into a specific shape and/or create a complex heating profile on the surface based on the machining of the foam. This design tool enables the designer to take advantage of a brand new design space for heaters. Other technical advantages will be readily apparent to one skilled in the art from the following figures, descriptions, and claims. Moreover, although specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

The teachings of the disclosure recognize that a problem with existing, filament-based heating systems is that their composition and shape make them vulnerable to localized failure and temperature instabilities. The zig-zag or serpentine shape of existing, filament-based heating elements causes current to flow in only a single path. Since resistive heating is proportional to $I^2R$, where I represents the current and R the local resistance, the current may become too great at places of low resistance, causing hot spots which can lead to failure of the heating system. Such single-point failures cause reduced lifetimes, increased downtimes, and costly product loss. Additionally, limitations on materials for and shapes of conventional heating elements diminishes the ability to tailor the specific heat profile of the heater for specialized applications.

The teachings of the disclosure recognize that by providing a monolithic heating system without making use of discrete filaments disposed therein, these above problems can be addressed. Monolithic elements of the type disclosed herein do not utilize a zig-zag or serpentine shape, and thus do not have a single current path. Rather, such monolithic elements may have many current paths, making them stable against local hot spots that occur in filament-based heating systems. These monolithic elements will continue to operate at negligibly-reduced capacity even if portions of the heater become damaged. In this way, the local impedance of the monolithic element can be tailored 20 to match the desired temperature profile, such that the monolithic element is immune to thermal runaway. Further, monolithic elements disclosed herein open up the design space for new, specialized applications. For example, concave and convex designs may be applied to tailor the heat profile to match the needs of the desired application. The following describes systems and methods of monolithic heating for providing these and other desired features. 25

Figure 1:
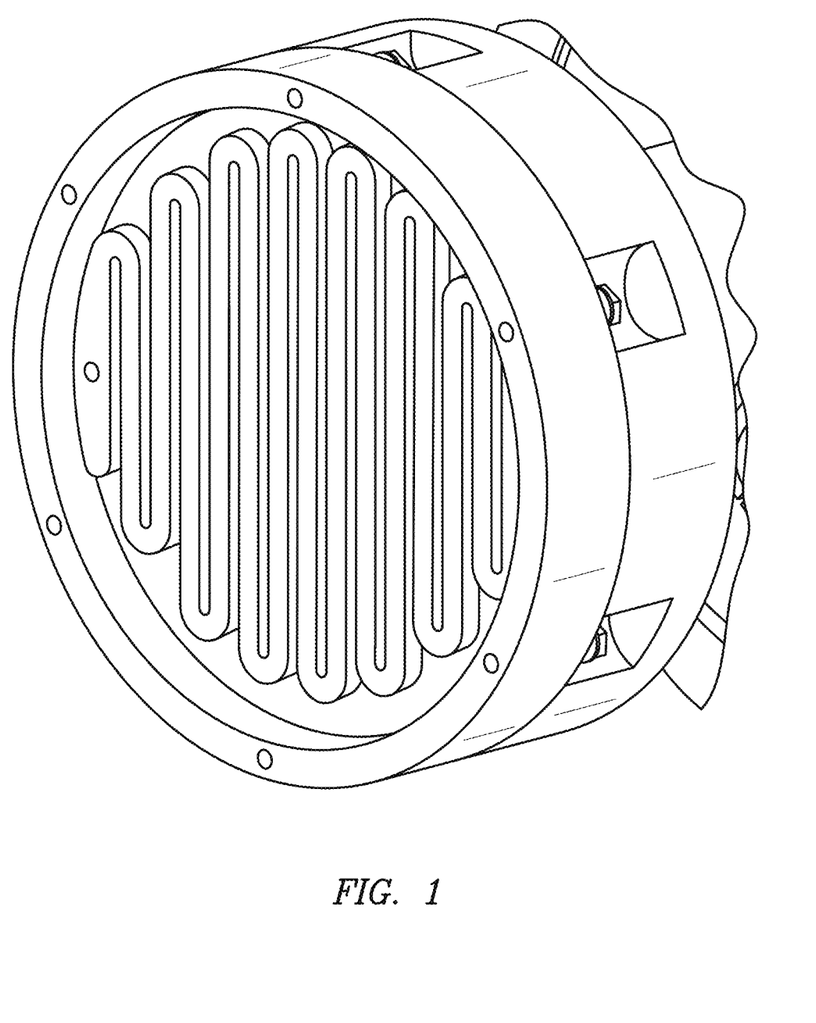
FIG. 1 is a schematic of a conventional heating system found in the prior art.

FIG. 1 is a schematic of a conventional heating system found in the prior art. The heating profile of heating systems is governed by the equation $$Q(x, y) = \frac{1}{2} I(x, y)^2 R(x, y).$$

In this equation, Q represents the local Ohmic heating (i.e., power), I represents the local current, and R represents the local resistance. Local resistance R is further defined by the equation $$R = \frac{\rho L}{A},$$

where ρ is the resistivity, L is the length of the heating element, and A is the cross-sectional area of the heating element. Thus, to achieve a uniform Ohmic heating profile, Q would be constant, and the local thickness of the monolithic heater would be set the local resistance R. As an example, the voltage and power requirements for high-temperature, in-vacuum physics applications are exacting, with voltage and current of the driving power supply being related to local resistance R through the equation V=IR. Thus, heating systems target a specific R to be effective. To accomplish this objective, graphite is typically molded into a long, winding zig-zag or serpentine path, as illustrated in FIG. 1. The graphite material forms a discrete heating element that operates as a filament. The longer the zig-zag or serpentine path, the larger the total resistance.

The single path of current in these prior art heating systems allow them to meet the necessary voltage, power, and resistance requirements, but also presents a single point of failure. Local hot spots typically occur in such heating systems, causing one part of the heater to weaken and eventually break, causing total failure of the heating system through thermal runaway. These failures lead to increased downtime, shorter product lifetime, and increased product loss. Further, the custom zig-zag or serpentine construction is generally fragile and difficult to manufacture.

Figure 2A:
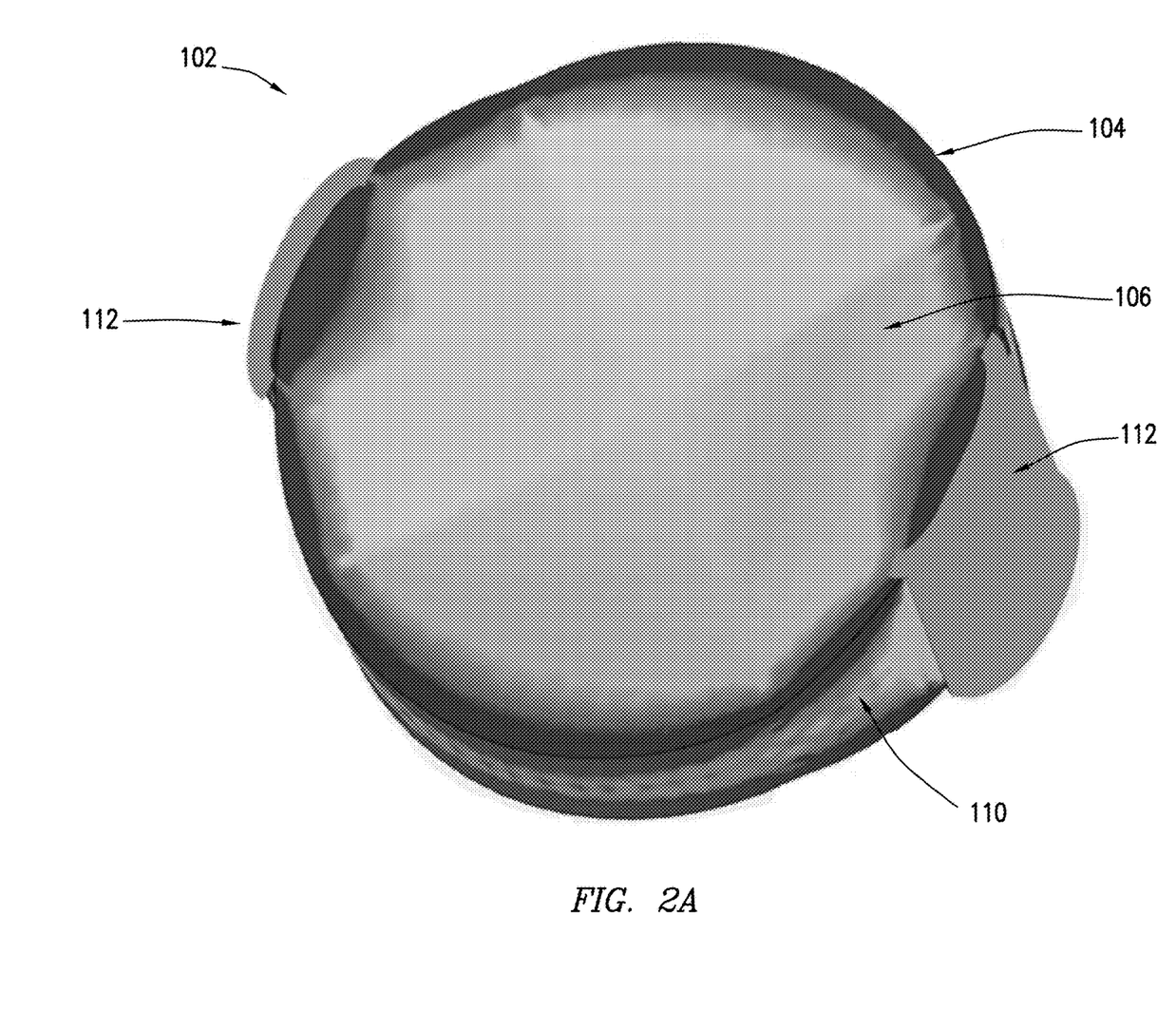
FIG. 2A is a schematic of a monolithic heating system according to the teachings of the present disclosure, according to certain embodiments.

FIG. 2A is a schematic of a monolithic heating system according to the teachings of the present disclosure, according to certain embodiments. As shown in FIG. 2A, monolithic heating system 102 may comprise, in some embodiments, a foam structure 104 (e.g., reticulated vitreous carbon) and a plurality of electrodes 112. In other embodiments, the plurality of electrodes 112 are not included in monolithic heating system 102.

In general, monolithic heating system 102 comprises a different structure and shape than conventional, filament-based heating systems. In some embodiments described herein, reticulated vitreous carbon structure 104 is formed from a single piece of reticulated vitreous carbon. A plurality of electrodes 112 may be applied to opposite sides of reticulated vitreous carbon structure 104 to generate heat in reticulated vitreous carbon structure 104. Thus, due to the application of electric current between the plurality of electrodes 112, and the monolithic nature and composition of reticulated vitreous carbon structure 104, many current paths through monolithic heating system 102 can be formed. The monolithic nature of the reticulated vitreous carbon structure 104 also allows it to heat up without making use of discrete heating elements such as filaments disposed therein. This provides, in some embodiments, several advantages, such as the ability to tailor the monolithic heating system 102 for specific applications while eliminating the problem with single points of failure which plagues conventional, filament-based heating systems.

In some embodiments, reticulated vitreous carbon structure 104 may comprise a bottom side 106, a top side 108 (not shown in FIG. 1A), and a width dimension 110. In some embodiments, "lensing" techniques may be applied to monolithic heating system 102 to focus radiative heat to desired points on the reticulated vitreous carbon structure 104. For example, bottom side 106 and/or top side 108 may be made concave or convex in shape. When a concave shape is applied, the emitted radiation comes off as diffuse from the exterior surface of reticulated vitreous carbon structure 104, but the concave shape leads to increased heating around the focal point of monolithic heating system 102. In some embodiments, such as shown in FIG. 2A, reticulated vitreous carbon may be disk-shaped. However, based on the specific "lensing" and machining techniques that are applied to reticulated vitreous carbon 104, reticulated vitreous carbon 104 may assume various other shapes, including linear, coaxial, and spherical.

In some embodiments, a plurality of electrodes 112 are applied to opposite sides of monolithic heating system 102. For example, the plurality of electrodes 112 may comprise a first electrode and a second electrode positioned on opposite ends of the thickness dimension 110. Application of an electric current to the first and second electrodes generates heat in reticulated vitreous carbon structure 104.

Figure 2B:
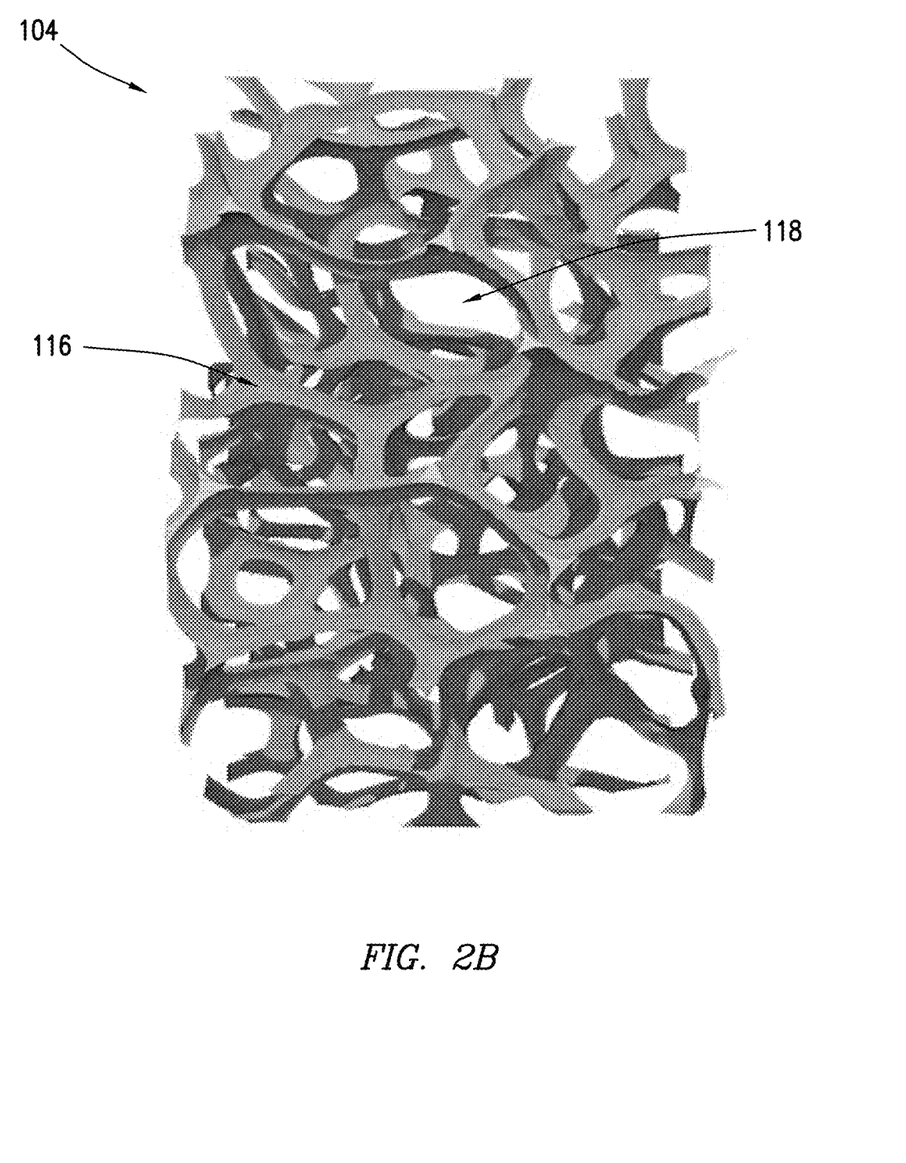
FIG. 2B is a close-up diagram of a reticulated vitreous carbon structure that may be incorporated in conjunction with the monolithic heating system of FIG. 2A, according to certain embodiments.

FIG. 2B is a close-up diagram of a reticulated vitreous carbon structure 104 that may be incorporated in conjunction with the monolithic heating system 102 of FIG. 2A, according to certain embodiments. Monolithic heating system 102 may also comprise other foam materials than reticulated vitreous carbon, in accordance with certain embodiments. In certain embodiments, reticulated vitreous carbon structure 104 may be a profiled billet structure. As shown in FIG. 2B, reticulated vitreous carbon structure 104 may comprise fibers 116 and voids 118. Together, fibers 116 and voids 118 form a reticulated pattern, in that that they may work together to form a network of paths for electric current to travel through reticulated vitreous carbon structure 104. In this way, reticulated vitreous carbon structure 104 takes on a mesh-like form. The network of current paths creates a near-infinite number of "spokes," as compared to conventional zig-zag or serpentine heating systems, which maintain a single path for current to travel through. If one "spoke" fails, others may continue facilitating current. The network structure thus enables monolithic heating system 102 to be significantly more robust and resistant to a single point of failure. Reticulated vitreous carbon structure 104 is available from various vendors as a type of foam material, including Ultramet Corporation. See https://ultramet.com/refractory-open-cell-foams/reticulated-vitreous-carbon-foam/. Reticulated vitreous carbon structure 104 may come in a variety of pore sizes, measured in pores per inch (ppi). The embodiment shown in FIG. 2B is 20 ppi.

In some embodiments, the physical composition of reticulated vitreous carbon structure 104 is similar to vitreous carbon, also known glassy carbon. Such material combines glassy and ceramic properties with those of graphite. Vitreous carbon includes important properties for heating system applications, such as high temperature resistance and low electrical resistance. In some embodiments, reticulated vitreous carbon structure has a bulk resistivity between 0.005 and 0.5 Ω·in. This bulk resistivity is higher than that of conventional carbon materials, enabling a much larger cross-section and smaller length to be used while achieving the same desired local resistance. Accordingly, a monolithic heating element can be constructed from single piece of reticulated vitreous carbon structure 104, using the methods described herein. In some embodiments, monolithic heating system 102 is able to maintain a local resistance between 0.05 and 50 Ohms while meeting the necessary voltage and power requirements for a given application. In some applications, reticulated vitreous carbon structures have a temperature limit of 600° F. in air and 6330° F. in an inert environment may be able withstand temperatures up to 3000° F. Additionally, reticulated vitreous carbon structure 104 is easy to machine and tailor for specific applications due to its versatile nature and flexible geometry.

In operation, monolithic heating system 102 may be heated to more than 3000° F. using various techniques described herein. For example, reticulated vitreous carbon structure 104 may be formed into a coaxial, disk shape. Reticulated vitreous carbon structure 104 may comprise a bottom side 106, a top side 108, and a width dimension 110. Bottom side 106 may be concave in shape. The shape of the structure may be chosen to yield a uniform temperature on the flat surface. First and second electrodes 112 may be attached to opposite ends of thickness dimension 110, and electric current may be applied to the first and second electrodes 112. The application of an electric current causes heat to be generated in reticulated vitreous carbon structure 104 through a network of current paths.

Figure 3A:
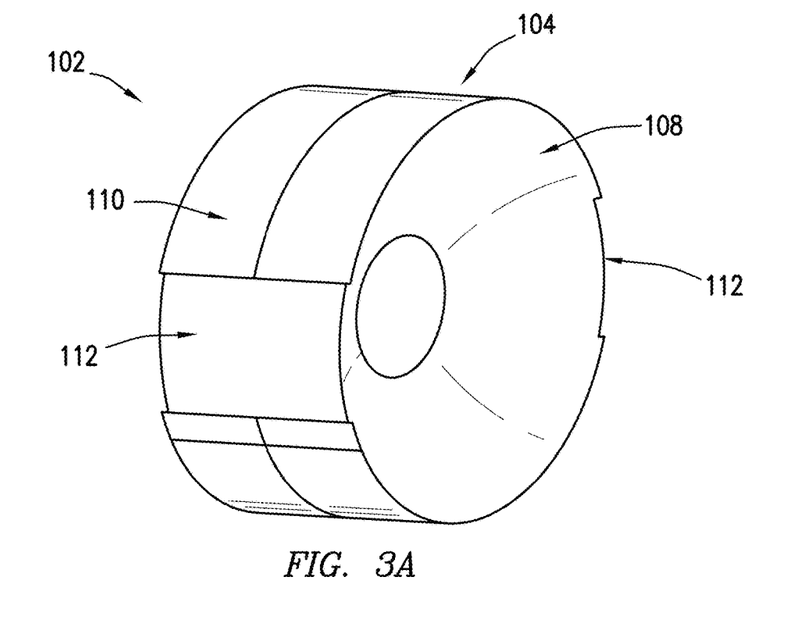
FIG. 3A is a schematic of another embodiment of the monolithic heating system of FIG. 2A where the top side of the reticulated vitreous carbon structure is concave in shape.

FIG. 3A is a schematic of another embodiment of the monolithic heating system of FIG. 2A where the top side of the reticulated vitreous carbon structure is concave in shape. As shown in FIG. 3A, monolithic heating system 102 may comprise reticulated vitreous carbon structure 104 and a plurality of electrodes 112. Reticulated vitreous carbon 104 may further have a top side 108. In some embodiments, top side 108 may be concave in shape. In other embodiments, top side 108 may be convex in shape. In other embodiments, top side 108 may be flat in shape.

Figure 3B:
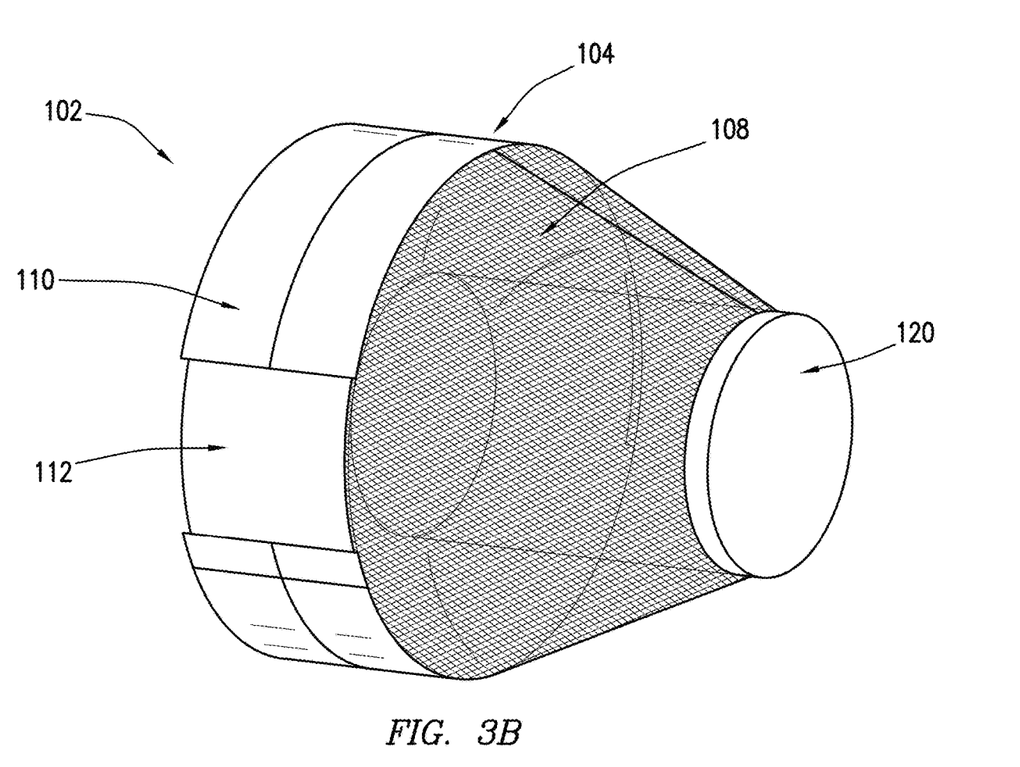
FIG. 3B is a schematic of yet another embodiment of the monolithic heating system of FIG. 2A where the top side of the reticulated vitreous carbon structure is convex in shape.

FIG. 3B is a schematic of yet another embodiment of the monolithic heating system of FIG. 2A where the top side of the reticulated vitreous carbon structure is concave in shape. As shown in FIG. 3B, monolithic heating system 102 may comprise reticulated vitreous carbon structure 104 and a plurality of electrodes 112. Reticulated vitreous carbon 104 may further have a top side 108. In some embodiments, top side 108 of reticulated vitreous carbon 104 may be concave in shape. In other embodiments, top side 108 may be convex in shape. In other embodiments, top side 108 may be flat in shape. In some embodiments, reticulated vitreous carbon 104 may be cone-shaped. In some embodiments, heat may be focused toward the center of top side 108 to generate heat onto target 120. Target 120 may be any object onto which heat from monolithic heating system 102 can be projected.

Figure 3C:
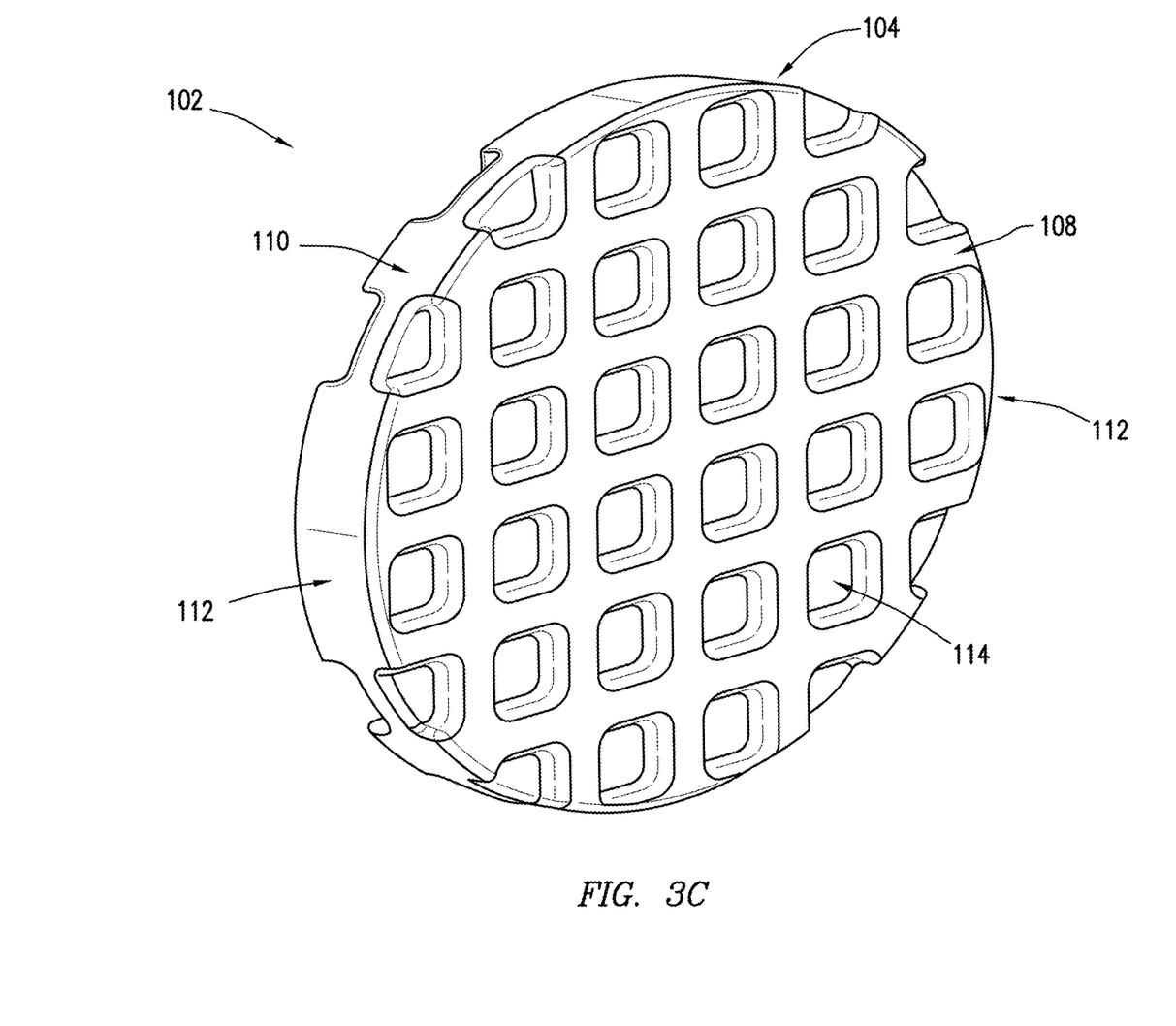
FIG. 3C is a schematic of an even further embodiment of the monolithic heating system of FIG. 2A where the top side of the reticulated vitreous carbon structure is flat in shape, creating hot spots.

FIG. 3C is a schematic of an even further embodiment of the monolithic heating system of FIG. 2A where the top side of the reticulated vitreous carbon structure is flat in shape, creating hot spots. As shown in FIG. 3C, monolithic heating system 102 may comprise reticulated vitreous carbon structure 104 and a plurality of electrodes 112. Reticulated vitreous carbon 104 may further have a top side 108. In some embodiments, top side 108 may be concave in shape. In other embodiments, top side 108 may be convex in shape. In other embodiments, top side 108 may be flat in shape. In some embodiments, such as that shown in FIG. 3C, a waffle pattern may be achieved to create a spotted heating pattern through hot spots 114. Computer-aided simulations may be used to optimize the specific design of monolithic heating system 102 and tailor it for specialized applications. For example, computer-aided simulations may be performed to determine whether a focal point or a uniform distribution is desired. The design space for monolithic heating system 102 is very large and is only limited by the imagination of the designer and the needs of a given application.

Figure 4A:
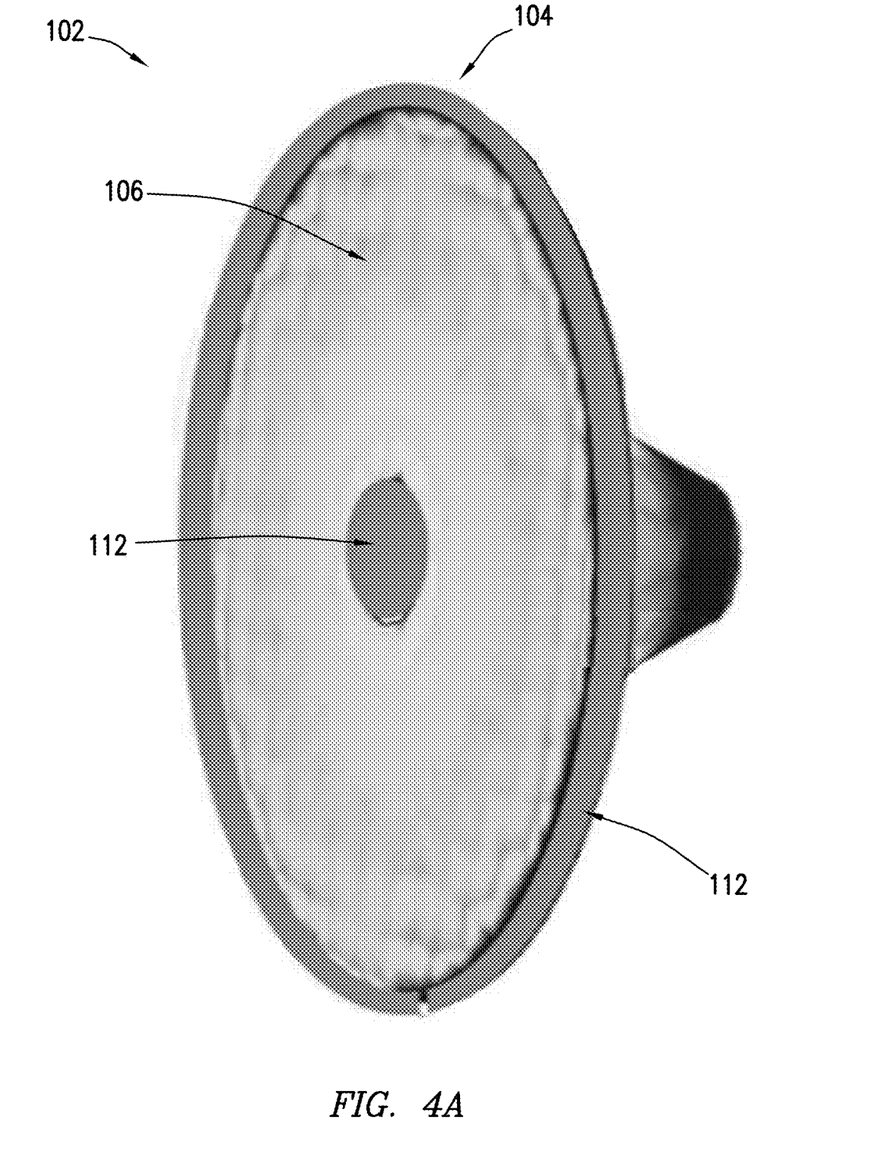
FIG. 4A is a schematic of a coaxial embodiment of a monolithic heating system that utilizes a different configuration of the plurality of electrodes than the embodiment shown in FIGS. 2A-2B and 3A-3C.

FIG. 4A is a schematic of a coaxial embodiment of a monolithic heating system that utilizes a different configuration of the plurality of electrodes than the embodiment shown in FIGS. 2A-2B and 3A-3C. As shown in FIG. 4A, monolithic heating system 102 may comprise, in some embodiments, a foam structure 104 (e.g., reticulated vitreous carbon) and a plurality of electrodes 112. In some embodiments, the plurality of electrodes 112 are not included in monolithic heating system 102. Reticulated vitreous carbon 104 may further have a bottom side 106, a top side 108 (not shown in FIG. 4A), and thickness dimension 110 (not shown in FIG. 4A). In some embodiments, the plurality of electrodes 112 may comprise a first electrode and a second electrode. The first electrode may be positioned in the center of bottom side 106 and the second electrode may be positioned around the thickness dimension 110 in a continuous manner. In such embodiments, electrical current may be applied to the first and second electrodes to generate heat in the reticulated vitreous carbon structure 104. Current may flow from one electrode to the other electrode through many paths in reticulated vitreous carbon structure 104, stabilizing monolithic heating system 102 against localized failure.

Figure 4B:
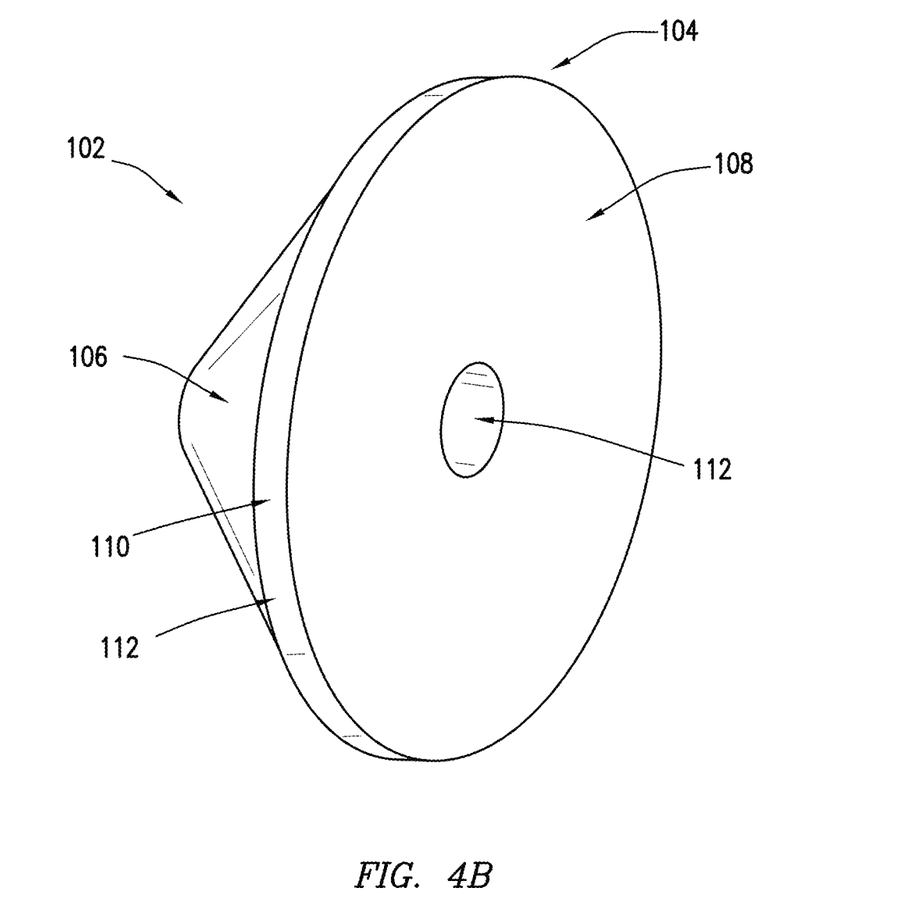
FIG. 4B is a schematic of a certain embodiment of the monolithic heating system of FIG. 4A where the bottom side of the reticulated vitreous carbon structure is convex in shape and the monolithic heating system is coaxial.

FIG. 4B is a schematic of a certain embodiment of the monolithic heating system of FIG. 4A where the bottom side of the reticulated vitreous carbon structure is convex in shape and the monolithic heating system is coaxial. As shown in FIG. 4B, monolithic heating system 102 may comprise reticulated vitreous carbon structure 104 and a plurality of electrodes 112. Reticulated vitreous carbon 104 may further have a bottom side 106, a top side 108, and a thickness dimension 110. In some embodiments, bottom side 106 and/or top side 108 of reticulated vitreous carbon 104 may be concave or convex in shape. In some embodiments, such as that shown in FIG. 4B, reticulated vitreous carbon 104 may be cone-shaped. In other embodiments, bottom side 106 and/or top side 108 may be flat in shape.

A number of implementations have been described. Nevertheless, it will be understood that various modifications may be made without departing from the spirit and scope of the invention. Elements of different implementations described herein may be combined to form other implementations not specifically set forth above. Elements may be left out of the processes, structures, and systems described herein without adversely affecting their operation. Furthermore, various separate elements may be combined into one or more individual elements to perform the functions described herein. Although certain example embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A heating element, comprising:
   a monolithic, reticulated vitreous carbon structure that is not a filament, wherein:
   the monolithic, reticulated vitreous carbon structure has a top side, a bottom side, and a thickness dimension;

the top side and the bottom side are concave in shape; and the monolithic, reticulated vitreous carbon structure has a bulk resistivity between 0.45 and 1.0 Ω·in. and a local resistance between 0.05 and 50Ω; and a plurality of electrodes attached to the monolithic, reticulated vitreous carbon structure, wherein application of an electric current between the plurality of electrodes causes current to flow in a plurality of discrete paths throughout the monolithic, reticulated vitreous carbon structure and generates a heating profile of one or more focal points on the top side of the monolithic, reticulated vitreous carbon structure.

2. The apparatus of claim 1, wherein the monolithic, reticulated vitreous carbon structure has a temperature limit of 600° F. in air and 6330° F. in an inert environment.

3. The apparatus of claim 2, further comprising a thickness dimension on the monolithic, reticulated vitreous carbon structure, wherein the plurality of electrodes comprises a first and second electrode positioned on opposite ends of the thickness dimension.

4. The apparatus of claim 2, wherein the plurality of electrodes comprises a first electrode positioned in the center of the bottom side and a second electrode positioned around the thickness dimension in a continuous manner.

5. A heating element, comprising:
a monolithic, reticulated vitreous carbon structure that is not a filament, wherein:
the monolithic, reticulated vitreous carbon structure has a top side, a bottom side, and a thickness dimension;
at least one of the top side and the bottom side of the monolithic, reticulated vitreous carbon structure are convex in shape; and
the monolithic, reticulated vitreous carbon structure has a bulk resistivity between 0.45 and 1.0 Ω·in. and a local resistance between 0.05 and 50Ω; and
a plurality of electrodes attached to the monolithic, reticulated vitreous carbon structure, wherein application of an electric current between the plurality of electrodes generates a heating profile of one or more focal points on the top side of the monolithic, reticulated vitreous carbon structure.

6. The apparatus of claim 5, wherein the monolithic, reticulated vitreous carbon structure is coaxial in shape.

7. The apparatus of claim 5, wherein the monolithic, reticulated vitreous carbon structure is disk-shaped.

8. The apparatus of claim 7, wherein the plurality of electrodes comprises a first electrode and a second electrode and wherein the first and second electrodes are positioned on opposite ends of the thickness dimension.

9. The apparatus of claim 5, wherein the structure is cone-shaped.

10. The apparatus of claim 9, wherein the plurality of electrodes comprises a first electrode and a second electrode, and wherein the first electrode is positioned in the center of the bottom side and the second electrode is positioned around the thickness dimension in a continuous manner.

11. A method of heating a heating element, comprising:
providing a monolithic structure that is not a filament, wherein:
the monolithic structure has a top side, a bottom side, and a thickness-dimension;
at least one of the top side and the bottom side of the monolithic structure are convex in shape; and
the monolithic structure has a bulk resistivity between 0.45 and 1.0 Ω·in. and a local resistance between 0.05 and 50Ω;
attaching a plurality of electrodes to the monolithic structure;
causing current to flow in a plurality of discrete paths throughout the monolithic structure by applying electric current to the plurality of electrodes; and
generating a heating profile of one or more focal points on the top side of the monolithic structure.

12. The method of claim 11, wherein the monolithic structure is a reticulated vitreous carbon structure.

13. The method of claim 12, wherein the monolithic structure is a disk-shaped structure.

14. The method of claim 12, wherein attaching a plurality of electrodes comprises placing a first and second electrode on opposite ends of the thickness dimension.

15. The method of claim 12, further comprising using the structure for a semiconductor or chemical manufacturing application.

* * * * *